(12) United States Patent
Horio

(10) Patent No.: US 8,715,784 B2
(45) Date of Patent: May 6, 2014

(54) METHOD OF PRODUCING OPTICAL LAYERED BODY, OPTICAL LAYERED BODY, POLARIZER AND IMAGE DISPLAY DEVICE

(75) Inventor: Tomoyuki Horio, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 766 days.

(21) Appl. No.: 12/044,834

(22) Filed: Mar. 7, 2008

(65) Prior Publication Data
US 2008/0221290 A1 Sep. 11, 2008

(30) Foreign Application Priority Data
Mar. 9, 2007 (JP) .................................. 2007-060617

(51) Int. Cl.
| B32B 7/02 | (2006.01) |
| B32B 27/40 | (2006.01) |
| C08F 26/02 | (2006.01) |
| C08G 18/67 | (2006.01) |
| C08G 18/81 | (2006.01) |
| C04B 35/14 | (2006.01) |
| C08J 7/04 | (2006.01) |
| G02B 1/10 | (2006.01) |

(52) U.S. Cl.
CPC ............... B32B 7/02 (2013.01); C08G 18/672 (2013.01); C08G 18/8116 (2013.01); C04B 35/14 (2013.01); C01P 2004/34 (2013.01); C08J 7/04 (2013.01); G02B 1/105 (2013.01)
USPC ...................... 427/407.1; 428/212; 428/423.1; 428/500; 428/507; 428/331; 428/532

(58) Field of Classification Search
CPC ........ B32B 7/02; G02B 1/105; C08G 18/672; C08G 18/8116; C08J 7/04; C04B 35/14; C01P 2004/34
USPC ............... 526/302; 428/423.1; 359/580, 582; 522/90, 93, 95
See application file for complete search history.

(56) References Cited

U.S. PATENT DOCUMENTS

| 4,143,013 | A | * | 3/1979 | Jenkinson et al. | 522/77 |
| 5,566,027 | A | * | 10/1996 | Saitoh et al. | 359/796 |
| 5,851,700 | A | * | 12/1998 | Honda et al. | 430/2 |
| 2006/0132922 | A1 | * | 6/2006 | Takao et al. | 359/601 |
| 2007/0058250 | A1 | * | 3/2007 | Muramatsu | 359/483 |

FOREIGN PATENT DOCUMENTS

| JP | 2004-069867 | 3/2004 |
| JP | 2005-107005 | 4/2005 |
| JP | 2006-126808 | 5/2006 |
| JP | 2007-046031 A | 2/2007 |
| WO | WO-2006/093237 A1 | 9/2006 |

* cited by examiner

Primary Examiner — Prashant J Khatri
(74) Attorney, Agent, or Firm — Novak Druce Connolly Bove + Quigg LLP

(57) ABSTRACT

A method for producing an optical layered body in order to obtain an optical layered body at a low cost without change in an appearance, an optical property, and the like after the pencil test is provided. The method pertains to producing an optical layered body, which comprises applying a coating composition on a light-transmitting substrate, wherein the coating composition comprises an urethane (meth)acrylate having a weight-average molecular weight of 5000 or more and having four or less functional groups, a (meth)acrylate having a weight-average molecular weight of 1000 or less, and a solvent having a solubility or a swelling property to the light-transmitting substrate.

20 Claims, 2 Drawing Sheets

METHOD OF PRODUCING OPTICAL LAYERED BODY, OPTICAL LAYERED BODY, POLARIZER AND IMAGE DISPLAY DEVICE

TECHNICAL FIELD

The present invention relates to a method for producing an optical layered body, an optical layered body, a polarizer and an image display device.

BACKGROUND ART

An optical layered body, which includes functional layers having various functions such as an antireflection property, a hardness property, an antistatic property, and an antiglare property, is provided on the outermost surfaces of image display devices such as a cathode-ray tube (CRT) display device, a liquid crystal display (LCD), a plasma display (PDP), an electroluminescence display (ELD), and a field emission display (FED) (Japanese Kokai Publication 2006-126808, Japanese Kokai Publication 2005-107005, and Japanese Kokai Publication 2004-69867).

As one of such functional layers, there has been known a low refractive index layer which may prevent reflection of external light and the like due to its refractive index different from that of other layers. As a method for forming such a low refractive index layer, there has been known a method for forming a layer by adding hollow silica.

On the other hand, a predetermined hardness is required in order to use an optical layered body as a product, and in order to evaluate a hardness property of the produced optical layered body, a pencil hardness test is generally carried out in conformity to JIS K 5600. However, in the case of the optical layered body which has a low refractive index layer containing the hollow silica, the hollow silica is crushed upon the pencil hardness test, which causes reduction in color reproducibility and deformation of the surface at the crushed portion, so that an appearance becomes poor. Thus, there has been a problem that the optical layered body after the test cannot be used as a product.

Therefore, a method for producing an optical layered body, which has a favorable appearance without deformation, has no influence on an optical property, and can be used as a product after the pencil test, has been required.

SUMMARY OF THE INVENTION

In view of the above-mentioned state of the art, it is an object of the present invention to provide a method for producing an optical layered body in order to obtain an optical layered body at a low cost without change in an appearance, an optical property, and the like after the pencil test.

The present invention provides a method for producing an optical layered body, which comprises applying a coating composition on a light-transmitting substrate, wherein the coating composition comprises an urethane (meth)acrylate having a weight-average molecular weight of 5000 or more and having four or less functional groups, a (meth)acrylate having a weight-average molecular weight of 1000 or less, and a solvent having a solubility or a swelling property to the light-transmitting substrate.

The (meth)acrylate preferably has three or more functional groups.

A solid content weight ratio of the urethane (meth)acrylate to the (meth)acrylate in the coating composition is preferably 0.1/99.9 to 5/5.

The light-transmitting substrate preferably comprises triacetyl cellulose.

The method for producing an optical layered body preferably further comprises forming a low refractive index layer.

The low refractive index layer preferably contains hollow silica.

The present invention also provides an optical layered body, which is obtained by the method for producing an optical layered body.

The present invention also provides a self-luminous image display device, comprising the optical layered body on the outermost surface.

The present invention also provides a polarizer comprising a polarizing element, wherein the polarizer includes the optical layered body on a surface of the polarizing element.

The present invention also provides a non-self-luminous image display device, comprising the optical layered body or the polarizer on the outermost surface.

Hereinafter, the present invention will be described in detail.

DETAILED DESCRIPTION OF THE INVENTION

The present invention provides a method for producing an optical layered body, comprising applying a coating composition on a light-transmitting substrate wherein the coating composition comprises an urethane (meth)acrylate having a weight-average molecular weight of 5000 or more and having four or less functional groups, a (meth)acrylate having a weight-average molecular weight of 1000 or less, and a solvent having a solubility or a swelling property to the light-transmitting substrate. Therefore, it is possible to form an optical layered body in which an optical property and an appearance are favorably maintained after the pencil hardness test.

In the method for producing an optical layered body of the present invention, a cushioning layer is formed between a hard-coating layer and a low refractive index layer, so that the above-mentioned problem is presumably solved. The hard-coating layer is formed in the vicinity of an interface on the side of the low refractive index layer of the light-transmitting substrate or formed in the vicinity of the interface on the side of the low refractive index layer of the light-transmitting substrate and on the light-transmitting substrate. In the case of the conventional optical layered body in which the hard coat layer and the low refractive index layer are in contact with each other, a hollow silica contained in the low refractive index layer is crushed by the hard coat layer having high hardness upon applying force to the optical layered body in the pencil hardness test and the like; thus the force-applied portion remains deformed (FIG. 1) and the hard coat layer is damaged, so that an appearance and an optical property are deteriorated. In the optical layered body obtained by the producing method of the present invention, a comparatively-soft cushioning layer is formed between the hard-coating layer and the low refractive index layer. The cushioning layer absorbs pressing force applied from the outermost surface to cause deformation of the low refractive index layer, and prevents crush of the hollow silica (FIG. 2). The cushioning layer also prevents damage of the hard-coating layer, so that presumably a surface shape and an optical property can be favorably maintained after the test.

FIG. 4 is an explanation view of a method for producing an optical layered body of the present invention.

In the method for producing an optical layered body of the present invention, application of a specific coating composition 6 on the light-transmitting substrate 5, as shown in FIG.

4(a), allows (meth)acrylate having a low molecular weight to infiltrate into the light-transmitting substrate 5, so that an infiltration layer 8, in which a material forming the light-transmitting substrate 5 and the (meth)acrylate are blended together, is formed, and a coat 7 is formed on the light-transmitting substrate 5 (FIG. 4(b)). The urethane (meth) acrylate having a high molecular weight is to be unevenly distributed in the coat 7. In the case of curing such an infiltration layer 8 and such a coat 7, a hard-coating layer 3 is presumably formed by curing the infiltration layer 8, and a cushioning layer 2 is presumably formed by curing the coat 7. Therefore, such a hard-coating layer and such a cushioning layer (hereinafter, these layers are collectively referred to as a hard coat layer) are formed by applying the coating composition once, so that production process becomes easy and it becomes possible to form an optical layered body at a low cost. Here In FIG. 4(b), the interface between the light-transmitting substrate 5 and the infiltration layer 8 and the interface between the infiltration layer 8 and the coat 7 are distinctly illustrated; however, these interfaces are not distinctly present in reality as mentioned below.

However, in the case that (meth)acrylate which has not been infiltrated into the light-transmitting substrate is present in the (meth)acrylate contained in the coating composition applied on the light-transmitting substrate, the layer in which the (meth)acrylate is unevenly distributed is formed on the side of the light-transmitting substrate of the coat and the layer in which the urethane (meth)acrylate is unevenly distributed is formed on the other side. In this case, in the case of curing the infiltration layer and the coat, a hard-coating layer is presumably formed by integrally curing the infiltration layer and the layer of the coat in which the (meth)acrylate is unevenly distributed, and a cushioning layer is presumably formed by curing the layer of the coat in which the urethane (meth)acrylate is unevenly distributed.

Moreover, since the coating composition used in the method for producing an optical layered body of the present invention contains a solvent having a solubility or a swelling property to the light-transmitting substrate, the cushioning layer and the hard-coating layer can be formed without an interface, and the hard coat layer can also be formed without an interface with the light-transmitting substrate, so that it is possible to obtain an optical layered body with no interference fringe and a favorable optical property. Also, the optical layered body has no interface between each of the layers, so that adhesion between each of the layers is excellent.

The method for producing an optical layered body of the present invention comprises applying a coating composition on the light-transmitting substrate, wherein the coating composition comprises an urethane (meth)acrylate having a weight-average molecular weight of 5000 or more and having four or less functional groups, a (meth)acrylate having a weight-average molecular weight of 1000 or less, and a solvent having a solubility or a swelling property to the light-transmitting substrate.

That is to say, in the method for producing an optical layered body of the present invention, the hard-coating layer and the cushioning layer can be simultaneously formed by applying a specific coating layer once on the light-transmitting substrate. Therefore, production process becomes easy and an optical layered body can be formed at a low cost.

The coating composition contains the urethane (meth)acrylate having a weight-average molecular weight of 5000 or more and having four or less functional groups and the (meth)acrylate having a weight-average molecular weight of 1000 or less.

Containing two resins each having a different molecular weight makes it possible to form the hard-coating layer and the cushioning layer by applying the coating composition once, so that it is possible to obtain an optical layered body excellent in an optical property and adhesion between layers.

The urethane (meth)acrylate can be obtained by reaction of polyalcohols, organic polyisocyanates, and hydroxy (meth) acrylate compounds. Here, (meth)acrylate refers to acrylate or methacrylate in the present description.

Examples of the polyalcohols include neopentyl glycol, 3-methyl-1,5-pentanediol, ethylene glycol, propylene glycol, 1,4-butanediol, 1,6-hexanediol, trimethylolpropane, pentaerythritol, tricyclodecanedimethylol, bis-[hydroxymethyl]-cyclohexane; polyester polyols obtained by the reaction between the polyalcohols and polybasic acids (for example, succinic acid, phthalic acid, hexahydrophthalic anhydride, terephthalic acid, adipic acid, azelaic acid, and tetrahydrophthalic anhydride); caprolactone alcohols obtained by the reaction between the polyalcohols and $\epsilon$-caprolactone; polycarbonate polyols (for example, polycarbonate diol obtained by the reaction between 1,6-hexanediol and diphenyl carbonate); and polyether polyols such as polyethylene glycol, polypropylene glycol, polytetramethylene glycol, and ethyleneoxide modified bisphenol A; and the like.

Examples of the organic polyisocyanates include isophorone diisocyanate, hexamethylene diisocyanate, tolylene diisocyanate, xylene diisocyanate, diphenylmethane-4,4'-diisocyanate, dicyclopentanyl isocyanate, and the like.

Examples of the hydroxy (meth)acrylate compounds include hydroxyethyl (meth)acrylate, hydroxypropyl (meth)acrylate, hydroxybutyl (meth)acrylate, dimethylol cyclohexyl mono(meth)acrylate, hydroxycaprolactone (meth)acrylate, and the like.

The urethane (meth)acrylate has a weight-average molecular weight of 5000 or more.

The weight-average molecular weight of less than 5,000 allows the urethane (meth)acrylate to easily infiltrate into the light-transmitting substrate, so that it becomes difficult to form the target cushioning layer. The weight-average molecular weight is more preferably 6000 to 50000.

In the present description, a weight-average molecular weight is a value obtained by polystyrene conversion in gel-permeation chromatography (GPC).

The urethane (meth)acrylate has four or less functional groups. The urethane (meth)acrylate having more than four functional groups has a high hard-coating property, so that it becomes difficult to form the target cushioning layer. That is, this case is not preferable because, upon applying force to the low refractive index layer in a pencil hardness test and the like, the hollow silica contained in the low refractive index layer is crushed by the hard coat layer having high hardness and the force-applied portion remains deformed, so that an appearance and an optical property are deteriorated. The urethane (meth)acrylate more preferably has two or less functional groups.

Examples of the commercially available urethane (meth) acrylate include UX8101D, UX5003D, and UX6101D, produced by Nippon Kayaku Co., Ltd.

Here, the above-mentioned functional group is a functional group in which a cross-linking reaction is caused by ultraviolet light or heat. Examples of such a functional group include an acryloyl group, a methacryloyl group, a vinyl group, an epoxy group, and the like.

With respect to a content of the urethane (meth)acrylate in the coating composition, the preferable lower limit is 10% by weight and the preferable upper limit is 90% by weight, and the more preferable lower limit is 15% by weight and the more preferable upper limit is 80% by weight. The urethane (meth)acrylate having four or less functional groups is used for forming the target cushioning layer; the content of less than 10% by weight may make it difficult to obtain the target cushioning property. The content of more than 90% by weight may cause reduction in hardness of the hard coat layer.

The coating composition further contains (meth)acrylate having a weight-average molecular weight of 1000 or less.

The (meth)acrylate having a weight-average molecular weight of more than 1000 causes reduction in permeability to the light-transmitting substrate and a mixed layer with the urethane (meth)acrylate having the weight-average molecular weight of 5000 or more tends to be formed, so that it becomes difficult to form the target cushioning layer. The weight-average molecular weight of the (meth)acrylate is preferably 200 to 1000, and more preferably 200 to 600.

A value of the weight-average molecular weight of the (meth)acrylate can be obtained by the same method as that for measuring the weight-average molecular weight of the urethane (meth)acrylate.

The (meth)acrylate is a monomer or an oligomer of acrylate or methacrylate, and examples thereof include 2-hydroxyethyl acrylate, 2-ethylhexyl acrylate, and phenoxyethyl acrylate as substances having one functional group; ethylene glycol diacrylate and 1,6-hexanediol diacrylate as substances having two functional groups; and trimethylolpropane triacrylate, pentaerythritol triacrylate, pentaerythritol tetraacrylate, dipentaerythritol hexaacrylate, and isocyanuric-acid modified triacrylate as substances having three or more functional groups; and the like. Acrylates having three or more functional groups are preferable among these in order to satisfy hardness (especially hardness in a pencil test) of the entire optical layered body. Here, the above-mentioned functional group includes the same functional group as that exemplified in the description of the urethane (meth)acrylate.

Also, the (meth)acrylate may be an oligomer of epoxy (meth)acrylate, urethane (meth)acrylate, polyester (meth)acrylate, polybutadiene (meth)acrylate, silicon (meth)acrylate, and the like as long as the weight-average molecular weight is satisfied. Two or more of these may be used in combination.

A blending ratio of the urethane (meth)acrylate having a weight-average molecular weight of 5000 or more and having four or less functional groups and the (meth)acrylate having a weight-average molecular weight of 1000 or less (urethane (meth)acrylate/(meth)acrylate) in the coating composition is preferably 0.1/99.9 to 5/5 in a solid content weight ratio. The blending ratio of less than 0.1/99.9 makes a cushioning layer thin, so that the target performance cannot be obtained. That is, the hollow silica contained in the low refractive index layer may be crushed in the pencil hardness test. The blending ratio of more than 5/5 does not cause crush of the hollow silica contained in the low refractive index layer, but causes reduction in hardness (especially hardness in the pencil test) of the entire optical layered body, so that the optical layered body may be heavily damaged. The blending ratio is more preferably 0.1/9.9 to 5/5.

The coating composition further contains a solvent having a solubility or a swelling property to the light-transmitting substrate.

Examples of the solvent having a solubility or a swelling property to the light-transmitting substrate include alcohols (for example, methanol, ethanol, isopropanol, butanol, benzyl alcohol, and PGME); ketones (for example, acetone, methyl ethyl ketone, methyl isobutyl ketone, and cyclohexanone); esters (for example, methyl acetate, ethyl acetate, propyl acetate, butyl acetate, methyl formate, ethyl formate, propyl formate, and butyl formate); halogenated hydrocarbons (for example, methylene chloride, chloroform, and carbon tetrachloride); amides (for example, dimethylformamide, dimethylacetamide, and n-methylpyrrolidone); ethers (for example, diethyl ether, dioxane, and tetrahydrofuran); ether alcohols (for example, 1-methoxy-2-propanol); and the like. From the viewpoint of more efficiently forming a cushioning layer, ketone solvents or ester solvents are more preferable, and methyl ethyl ketone, methyl acetate, ethyl acetate, butyl acetate, anone, PGME, or methyl isobutyl ketone is further preferable.

The coating composition preferably further contains a photopolymerization initiator.

Examples of the photopolymerization initiator include acetophenones (for example, 1-hydroxy-cyclohexyl-phenylketone, commercially available as trade name "Irgacure 184" produced by Ciba Specialty Chemicals Inc.), benzophenones, thioxanthones, benzoin, benzoin methyl ether, aromatic diazonium salts, aromatic sulfonium salts, aromatic iodonium salts, metallocene compounds, benzoin sulfonate, and the like. Each of these may be used alone or two or more of these may be used in combination.

An additive amount of the photopolymerization initiator is preferably 0.1 to 10 parts by weight to 100 parts by weight of the solid resin content of the coating composition.

The coating composition can contain other components in addition to the above-mentioned components. Examples of the other components include a resin other than the resins described above, an antiglare agent, an antistatic agent, a surfactant, a coupling agent, a thickening agent, an anticoloring agent, a coloring agent such as pigment or dye, an antifoaming agent, a leveling agent, a flame retarder, an ultraviolet absorber, an infrared absorber, a tackifier, a polymerization inhibitor, an antioxidant, a surface modifier, and the like. As these components, publicly known substances generally used for producing an optical layered body can be used.

The coating composition can be obtained by mixing and dispersing the above-mentioned components, the other components and the solvent. A paint shaker, a bead mill, or the like may be used for mixing and dispersing.

The method for producing an optical layered body of the present invention includes applying the coating composition on the light-transmitting substrate.

The light-transmitting substrate preferably has smoothness, heat resistance, and excellent mechanical strength, into which the components in the coating composition may infiltrate, and for example, triacetyl cellulose (TAC) is preferable. This is because such a substrate allows the coating composition to infiltrate into the substrate, and that it is possible to form a layer excellent in adhesion.

A thickness of the light-transmitting substrate is preferably 20 to 300 μm, and more preferably 30 to 200 μm. In the case that the light-transmitting substrate is a plate-like body, the thickness may be 300 to 5000 μm. Moreover, upon applying the coating composition on the light-transmitting substrate, the substrate may be preliminarily subjected to application of an anchor agent or a coating material referred to as a primer onto the substrate, in addition to physical treatments such as a corona discharge treatment and an oxidation treatment, in order to improve the adhesive property of the substrate.

The application method is not particularly limited, and examples thereof include various methods such as a spin-coating method, a dip method, a spray method, a die-coating method, a bar-coating method, a roll coater method, a meniscus coater method, a flexo printing method, a screen printing method, and a bead coater method.

An application amount of the coating composition is preferably 1 to 30 g/cm² (as a dry weight). Application of the coating composition with the application amount in the above-mentioned range makes it possible to suitably form a hard-coating layer and a cushioning layer by applying the coating composition once. The application amount of less than 1 g/cm² may cause reduction in a hard-coating property. The application amount of more than 30 g/cm² causes too high hardness of a layer to be formed, so that a crack may be generated by bending the substrate only a little. The application amount is more preferably 3 to 20 g/cm².

After the application, the coat is dried as needed, and then the coat is cured by irradiation of an electron beam or ultraviolet light. In the case of the electron-beam curing, an electron beam having energy of 100 to 300 KeV and the like is used. In the case of the ultraviolet-light curing, ultraviolet light, which is emitted from light beams of an ultra high-pressure mercury lamp, a high-pressure mercury lamp, a low-pressure mercury lamp, a carbon arc, a xenon arc, a metal halide lamp, and the like, is used.

The method for producing an optical layered body of the present invention preferably further includes forming a low refractive index layer.

As shown in FIG. 4, after the coating composition 6 is applied on the light-transmitting substrate 5 (FIG. 4(a)) to form the infiltration layer 8 and the coat 7 (FIG. 4(b)) and the infiltration layer 8 and the coat 7 are cured to form the hard-coating layer 3 and the cushioning layer 2, the low refractive index layer 9 is formed in addition (FIG. 4(c)), so that it is possible to prevent coloring and the like caused by an interaction between layers, and to improve an antireflection property.

The low refractive index layer is formed on the surface of the cushioning layer, and the refractive index thereof is lower than that of the cushioning layer or the hard-coating layer. In the preferable embodiment of the present invention, the refractive index of the cushioning layer or the hard-coating layer is preferably 1.5 or more, and the refractive index layer of the low refractive index layer is preferably less than 1.5, more preferably 1.45 or less. Thus, layering the layers having different refractive indexes makes it possible to improve an antireflection property because the optical layered body becomes a low reflection layer.

The method for producing an optical layered body of the present invention is preferably used for forming an optical layered body having a low refractive index layer containing silica.

The low refractive index layer is preferably formed by 1) a silica-containing resin, 2) a fluororesin containing silica and the like.

The above-mentioned silica is preferably hollow silica. The hollow silica is easy to produce and hardness is high, so that in the case of forming the low refractive index layer by mixing the hollow silica with a binder resin, strength of the layer is improved and it becomes possible to set the refractive index in the range of about 1.20 to 1.45.

Examples of the hollow silica include silica fine particles prepared by a method disclosed in Japanese Kokai Publication 2001-233611. Also, silica fine particles and the like obtained by methods disclosed in Japanese Kokai Publication Hei7-133105, Japanese Kokai Publication 2002-79616, Japanese Kokai Publication 2006-106714, and the like. Moreover, the hollow silica may be the silica fine particles whose surface is further treated. Examples of the above-mentioned treatments include hydrophobization of the surface, hydrophilization of the surface, addition of an ultraviolet-light-reactive group, or the like. The treating method is not particularly limited, and any desired method, such as a method using a silane coupling agent, can be used depending on the object.

An example of such hollow silica is used hollow silica produced by Catalysts & Chemicals Industries Co., Ltd.

An average particle size of the hollow silica is preferably 5 to 300 nm, more preferably 8 to 100 nm, and further preferably 10 to 80 nm. The average particle size of the hollow silica within this range makes it possible to impart excellent transparency to the low refractive index layer. Here, the average particle size is a value measured by a dynamic light-scattering method and the like. The content of the hollow silica is preferably 0.1 to 500 parts by weight, and more preferably 10 to 200 parts by weight, with respect to 100 parts by weight of the binder resin in the low refractive index layer.

A refractive index of the hollow silica is preferably about 1.20 to 1.40. Also, a porosity of the hollow silica is preferably about 10 to 90%.

The binder resin preferably has transparency, and examples thereof include an ionizing radiation-curable resin to be cured with ultraviolet light or an electron beam; a mixture of the ionizing radiation-curable resin and a solvent drying-type resin (a resin, such as a thermoplastic resin, in which a coat is formed only by evaporating a solvent previously added in order to adjust a solid content during the application of the resin); or a thermosetting resin. The ionizing radiation-curable resin is preferable among these. Here, the term "resin" includes resin components such as a monomer and an oligomer.

Examples of the ionizing radiation-curable resin include compounds having one or more unsaturated bonds such as a compound having an acrylate functional group. Examples of the compounds having one unsaturated bond include ethyl (meth)acrylate, ethylhexyl (meth)acrylate, styrene, methylstyrene, N-vinylpyrrolidone, and the like. Examples of the compounds having two or more unsaturated bonds include polyfunctional compounds such as polymethylolpropane tri (meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate; and reaction products (for example, a poly(meth)acrylate ester of polyhydric alcohol) of the polyfunctional compound with (meth)acrylate, and the like.

The fluororesin is a polymerizable compound containing a fluorine atom at least in a molecule or a polymer of the polymerizable compound. The polymerizable compound is not particularly limited, and preferable examples thereof include a polymerizable compound having a curable and reactive group such as a functional group to be cured with ionizing radiation (ionizing radiation-curable group) and a polar group to be cured with heat (heat-curable polar group). Furthermore, compounds simultaneously having these reactive groups together may also be used.

As the polymerizable compound having an ionizing radiation-curable group containing a fluorine atom, fluorine-containing monomers having an ethylenic unsaturated bond can be widely used. More specific examples thereof include fluoroolefins (for example, fluoroethylene, vinylidene fluoride, tetrafluoroethylene, hexafluoropropylene, perfluorobutadiene, perfluoro-2,2-dimethyl-1,3-dioxole, and the like). Examples of the polymerizable compound having the (meth) acryloyloxy group include: (meth)acrylate compounds having a fluorine atom in a molecule, such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl) ethyl (meth)acrylate, 2-(perfluorooctyl)ethyl (meth)acrylate, 2-(perfluorodecyl)ethyl (meth)acrylate, α-trifluoromethyl methacrylate, and α-trifluoroethyl methacrylate; fluorine-containing polyfunctional (meth)acrylate compounds having a fluoroalkyl group, a fluorocycloalkyl group, or a fluoroalkylene group having 1 to 14 carbon atoms, which has at least three fluorine atoms in a molecule, and at least two (meth) acryloyloxy groups.

Examples of the polymerizable compound having a heat-curable polar group containing a fluorine atom include 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide. Preferable examples of the heat-curable polar group include groups for forming a hydrogen bond such as a hydroxyl group, a carboxyl group, an amino group, and an epoxy group. These groups are superior in not only the adhesion to a coat but also an affinity for an inorganic ultra fine particle such as silica.

Examples of the polymerizable compounds (fluororesin) having the ionizing radiation-curable group and the heat-curable polar group together include partially and fully fluorinated alkyl, alkenyl, or aryl esters of acrylic acid or methacrylic acid, fully or partially fluorinated vinyl ethers, fully or partially fluorinated vinyl esters, fully or partially fluorinated vinyl ketones, and the like.

Examples of the polymer of the polymerizable compound containing fluorine atoms include polymers of a monomer or a mixture of monomers, containing at least one fluorine-containing (meth)acrylate compound of the polymerizable compounds having the ionizing radiation-curable group; copolymers of at least one fluorine-containing (meth)acrylate compound and a (meth)acrylate compound not containing a fluorine atom in a molecule such as methyl (meth)acrylate, ethyl (meth)acrylate, propyl (meth)acrylate, butyl (meth) acrylate and 2-ethylhexyl (meth)acrylate; and monopolymers or copolymers of a fluorine-containing monomer like fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene.

Further, a silicone-containing vinylidene fluoride copolymer prepared by containing a silicone component in these copolymers can also be used as a polymer of the polymerizable compound. Examples of the silicone component in this case include (poly)dimethylsiloxane, (poly)diethylsiloxane, (poly)diphenylsiloxane, (poly)methylphenylsiloxane, alkyl modified (poly)dimethylsiloxane, azo group-containing (poly)dimethylsiloxane, dimethylsilicone, phenylmethylsilicone, alkyl-aralkyl modified silicone, fluorosilicone, polyether modified silicone, aliphatic acid ester modified silicone, methyl hydrogen silicone, silanol group-containing silicone, alkoxy group-containing silicone, phenolic group-containing silicone, methacryl modified silicone, acryl modified silicone, amino modified silicone, carboxylic acid modified silicone, carbinol modified silicone, epoxy modified silicone, mercapto modified silicone, fluorine modified silicone, polyether modified silicone, and the like. Among others, a silicone component having a dimethylsiloxane structure is preferable.

In addition to the compounds described above, compounds obtained by reacting a fluorine-containing compound having at least one isocyanate group in a molecule with a compound having at least one functional group, which reacts with an isocyanate group such as an amino group, a hydroxyl group or a carboxyl group, in a molecule; compounds obtained by reacting fluorine-containing polyol such as fluorine-containing polyether polyol, fluorine-containing alkyl polyol, fluorine-containing polyester polyol, and fluorine-containing ε-caprolactone modified polyol with a compound having an isocyanate group; and the like, can be used as a fluororesin.

In forming the low refractive index layer, the low refractive index layer can be formed through use of a composition for forming a refractive index layer which contains, for example, the resin or the fluororesin, and the hollow silica. More specifically, a solution or a dispersion formed by dissolving or dispersing the raw material component (resin, etc) and the additives (for example, a polymerization initiator, an antistatic agent, an antiglare agent, etc) as required in a solvent is used as a composition for forming a low refractive index layer; then the composition is applied on the cushioning layer to cure the coat, so that a low refractive index layer can be obtained. Here, examples of the additives such as the polymerization initiator, the antistatic agent, and the antiglare agent include publicly known additives used for producing an optical layered body.

Examples of the solvent include water, alcohols (for example, methanol, ethanol, propanol, isopropanol, n-butanol, s-butanol, t-butanol, benzyl alcohol, and PGME), ketones (for example, acetone, methyl ethyl ketone, methyl isobutyl ketone, cyclohexanone, heptanone, diisobutyl ketone, and diethyl ketone), esters (for example, methyl acetate, ethyl acetate, propyl acetate, butyl acetate, methyl formate, ethyl formate, propyl formate, butyl formate, and PGMEA), aliphatic hydrocarbons (for example, hexane and cyclohexane), halogenated hydrocarbons (for example, methylene chloride, chloroform, and carbon tetrachloride), aromatic hydrocarbons (for example, benzene, toluene, and xylene), amides (for example, dimethylformamide, dimethylacetamide, and n-methylpyrrolidone), ethers (for example, diethyl ether, dioxane, and tetrahydrofuran), ether alcohols (for example, 1-methoxy-2-propanol), and the like. Methyl isobutyl ketone, methyl ethyl ketone, isopropyl alcohol (IPA), n-butanol, s-butanol, t-butanol, PGME, and PGMEA are preferable among these.

A preparation method of the composition for forming a refractive index layer may be used as long as the components can be uniformly mixed, and the components only have to be mixed according to a publicly known method. For example, the components can be mixed using publicly known apparatus described in the coating composition.

In forming the low refractive index layer, it is preferable to set the viscosity of the composition for forming a low refractive index layer in a range of 0.5 to 5 cps (25° C.), where a preferable application property is attained. The viscosity is more preferably 0.7 to 3 cps (25° C.). An excellent antireflection film of visible light can be realized, a uniform thin film can be formed producing irregularity of application, and a low refractive index layer having particularly excellent adhesion to the substrate can be formed.

As the application method, publicly known methods may be used. For example, the same methods as those for the coating composition can be used.

The curing method may be the same method as that for the coating composition. In the case that a heating means is used for the hardening the resin, preferable, a heat-polymerization initiator, which generates, for example, a radical by heat to initiate polymerization of a polymerizable compound, is added to a fluororesin composition.

A film thickness (nm) $d_A$ of the low refractive index layer preferably satisfies the following formula (I):

$$d_A = m\lambda/(4n_A) \tag{I}$$

(wherein $n_A$ represents a refractive index of the low refractive index layer, m represents a positive odd, and preferably 1, λ is a wavelength, and preferably value of 480 to 580 nm).

Further, in the present invention, it is preferable from the viewpoint of reducing a refractive factor that the low refractive index layer satisfies the following formula (II):

$$120 < n_4 d_4 < 145 \qquad (II)$$

The optical layered body produced in the present invention has the light-transmitting substrate and the hard coat layer, but it may include an antistatic layer, an antiglare layer, an antifouling layer, a high refractive index layer, or a medium refractive index layer as arbitrary layer as required in addition to the low refractive index layer described above. An antistatic agent, an antiglare agent, an antifouling agent, a high refractive index agent, a medium refractive index layer or a resin, usually used, is added to prepare compositions, and using these compositions, the antistatic layer, the antiglare layer, the antifouling layer, the high refractive index layer, and the medium refractive index layer may be formed by a publicly known method.

A total light transmittance of the optical layered body is preferably 90% or more. The total light transmittance of less than 90% may impair color reproducibility in the case that the optical layered body is placed on the display surface. The total light transmittance is more preferably 95% or more, and further preferably 98% or more.

A haze value of the optical layered body is preferably 10% or less. The haze value of more than 10% may impair color reproducibility in the case that the optical layered body is placed on the display surface. The haze value is more preferably 5% or less.

An aspect of the optical layered body formed by the method for producing an optical layered body of the present invention will be described by referring to the drawings. As shown in FIG. 3, for example, the optical layered body includes a low refractive index layer 1 containing hollow silica 4, a hard-coating layer 3, and a light-transmitting substrate 5. A cushioning layer 2 is probably formed between the low refractive index layer 1 and the hard-coating layer 3. The present invention also provides such an optical layered body obtained by the method for producing an optical layered body of the present invention. The optical layered body of the present invention preferably has the low refractive index layer on the cushioning layer as shown in FIG. 3. The optical layered body of the present invention may be composed of arbitrary layers in accordance with the object, and is not limited to the aspect described above.

The optical layered body of the present invention can be formed into a polarizer by providing the optical layered body on the side opposite to the side where the hard coat layer in the optical layered body exists on the surface of the polarizing element. The polarizer like this also constitutes the present invention.

The polarizing element is not particularly limited, and as the polarizing element, for example, a polyvinyl alcohol film, a polyvinyl formal film, a polyvinyl acetal film or an ethylene-vinyl acetate copolymer saponified film, which is dyed with iodine or the like and stretched, can be used. In laminating the polarizing element and the optical layered body of the present invention, preferably, the light-transmitting substrate (preferably, triacetyl cellulose film) is subjected to saponification treatment. The saponification treatment can improve an adhesive property and can impart an antistatic effect.

The present invention also provides an image display device including the optical layered body or the polarizer at the outermost surface. The image display device may be a non-self-luminous image display device such as an LCD, or may be a self-luminous image display device such as a PDP, an FED, an ELD (organic EL, inorganic EL) and a CRT.

The LCD, which is a typical example of the non-self-luminous type, includes a light-transmitting display and a light source apparatus to irradiate the light-transmitting display from the backside. When the image display device of the present invention is an LCD, the optical layered body of the present invention or the polarizer of the present invention is formed on the surface of the light-transmitting display.

When the present invention provides a liquid crystal display device having the optical layered body, a light source of the light-source apparatus irradiates from the side on which the light-transmitting substrate exists of the optical layered body. Here, in the STN-type liquid crystal display device, a retardation plate may be inserted between a liquid crystal display element and the polarizer. An adhesive layer may be provided between the respective layers of the liquid crystal display device as required.

The PDP, which is the self-luminous image display device, includes a surface-glass substrate (an electrode is formed on the surface) and a backside-glass substrate (an electrode and a fine groove are formed on the surface, and red, green, and blue phosphor layers are formed in the groove) which is located at a position opposite to the surface-glass substrate with a discharge gas filled between these substrates. When the image display device of the present invention is a PDP, the PDP includes the optical layered body described above on the surface of the surface-glass substrate or a front plate (a glass substrate or a film substrate) thereof.

The self-luminous image display device may be an ELD apparatus in which luminous substances of zinc sulfide or diamines materials to emit light through the application of a voltage are deposited on a glass substrate by vapor deposition and display is performed by controlling a voltage to be applied to the substrate, or image display devices such as CRT, which converts electric signals to light to generate visible images. In this case, the image display devices includes the optical layered body described above on the outermost surface of each of the display devices or the surface of a front plate thereof.

In any case, the image display device of the present invention can be used for displays of televisions, computers, word processors, and the like. Particularly, the device can be suitably used for the surface of the displays for high-resolution images such as a CRT, a liquid crystal panel, a PDP, an ELD, and an FED.

Effects of the Invention

Since the method for producing an optical layered body of the present invention has the above-mentioned constitution, it is possible to produce an optical layered body in which an appearance and an optical property can be favorably maintained after the pencil hardness test and the like. Therefore, it is possible to suitably apply an optical layered body obtained by the method for producing an optical layered body of the present invention to a cathode-ray tube (CRT) display device, a liquid crystal display (LCD), a plasma display (PDP), an electroluminescence display (ELD), a field emission display (FED), and the like.

Figure 1:
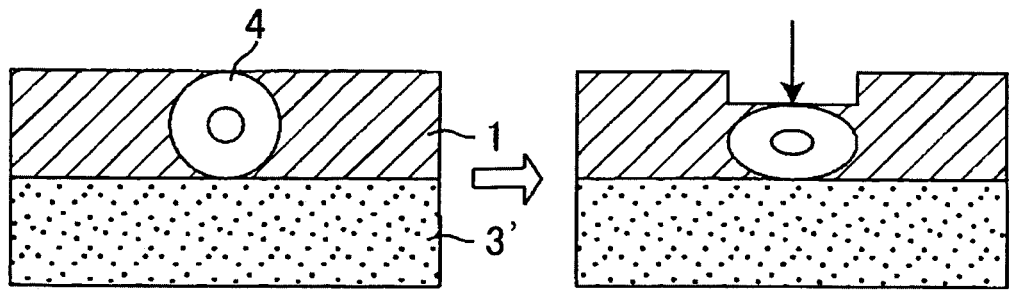
FIG. 1 is one example of a schematic view of a part of an optical layered body of prior art.
Figure 2:
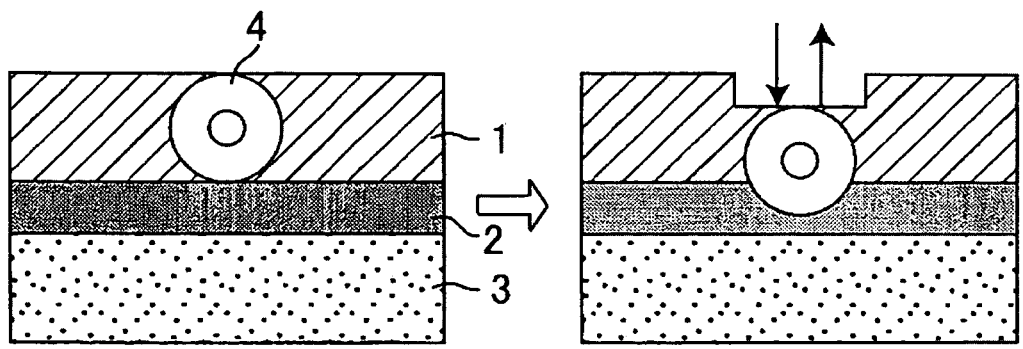
FIG. 2 is one example of a schematic view of a part of an optical layered body of the present invention.
Figure 3:
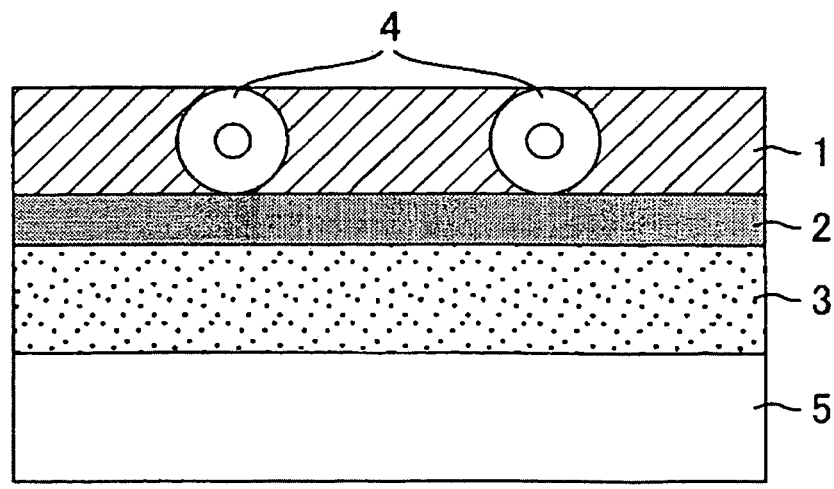
FIG. 3 is one example of a schematic view of an optical layered body of the present invention.
Figure 4:
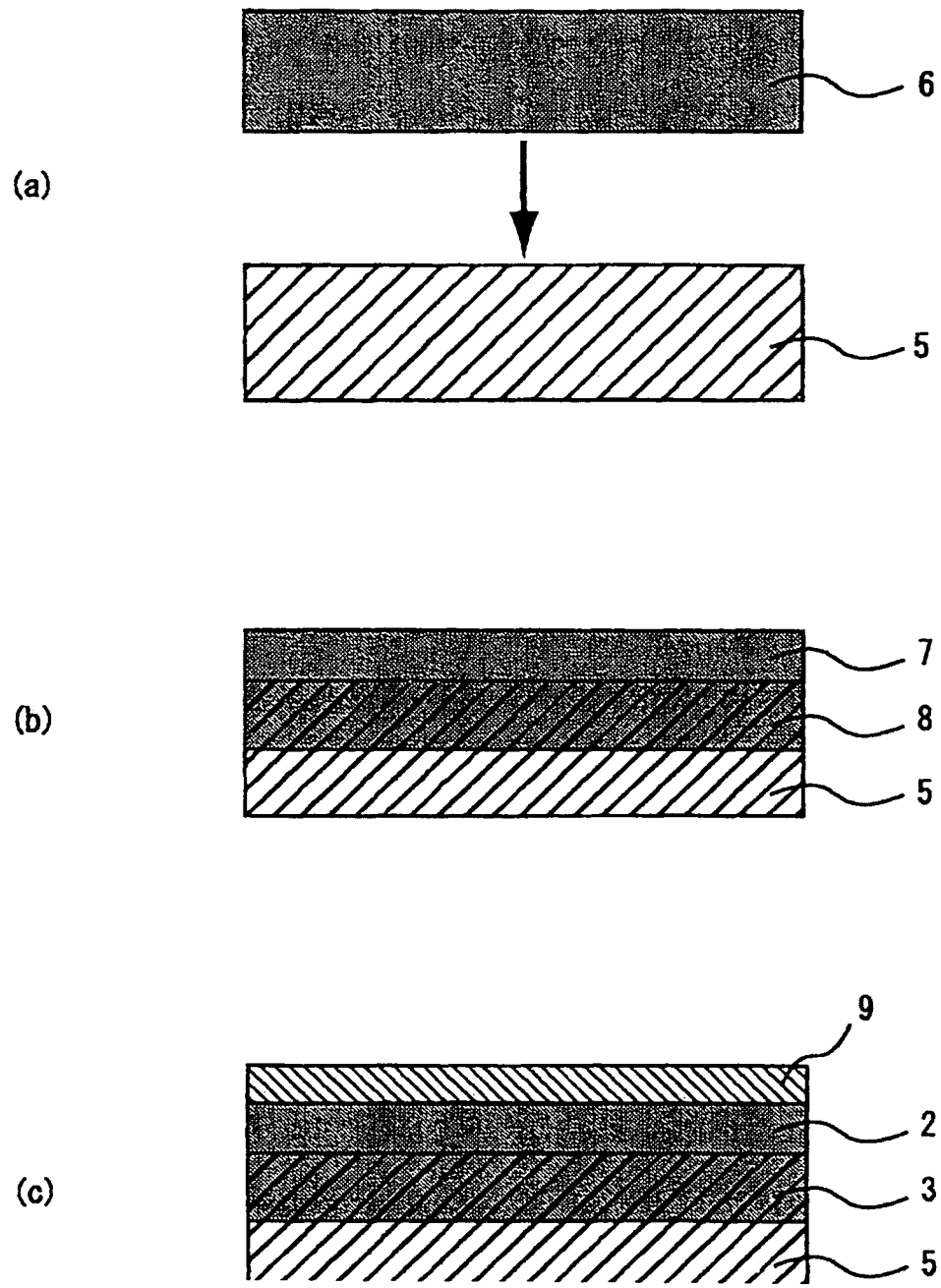
FIG. 4 is an explanation view of a method for producing an optical layered body of the present invention.

EXPLANATION OF SYMBOLS 1, 9 Low refractive index layer
2 Cushioning layer
3 Hard-coating layer
4 Hollow silica
5 Light-transmitting substrate
6 Coating composition
7 Coat
8 Infiltration layer

BEST MODE FOR CARRYING OUT THE INVENTION

Hereinafter, the present invention will be described in more detail based on examples.

EXAMPLES

The following description shows examples and comparative examples to more specifically discuss characteristics of the present invention. However, the application of the present invention is not limited to those in examples.

Production Example 1

Preparation of Coating Composition 1

A coating composition 1 having the following composition was prepared.
Urethane acrylate (UV1700B; produced by The Nippon Synthetic Chemical Industry Co., Ltd., number of functional groups: 10, weight-average molecular weight (Mw): 2000): 4 parts by weight
Urethane acrylate (UX8101D; produced by Nippon Kayaku Co., Ltd., number of functional groups: 2, Mw: 5000 or more): 1 part by weight
Polyester acrylate (M9050; produced by TOAGOSEI CO., LTD., number of functional groups: 3, Mw: 400 to 430): 5 parts by weight
Polymerization initiator (Irgacure 184; produced by Ciba Specialty Chemicals Inc.): 0.4 parts by weight
Methyl ethyl ketone: 10 parts by weight Production Example 2

Preparation of Coating Composition 2

A coating composition 2 having the following composition was prepared.
Urethane acrylate (DPHA40H; produced by Nippon Kayaku Co., Ltd., number of functional groups: 8, Mw: 7000): 4 parts by weight
Urethane acrylate (UX5003D; produced by Nippon Kayaku Co., Ltd., number of functional groups: 2, Mw: 5000 or more): 1 part by weight
Isocyanuric-acid modified triacrylate (ARONIX M315; produced by TOAGOSEI CO., LTD., number of functional groups: 3, Mw: 423): 5 parts by weight
Polymerization initiator (Irgacure 184; produced by Ciba Specialty Chemicals Inc.): 0.4 parts by weight
Methyl ethyl ketone: 10 parts by weight Production Example 3

Preparation of Coating Composition 3

A coating composition 3 having the following composition was prepared.
Urethane acrylate (BEAMSET 577; produced by Arakawa Chemical Industries, Ltd., Mw: 1000): 4 parts by weight
Urethane acrylate (UX6101D; produced by Nippon Kayaku Co., Ltd., number of functional groups: 2, Mw: 5000 or more): 1 part by weight
Dipentaerythritol hexaacrylate (DPHA; produced by Nippon Kayaku Co., Ltd., number of functional groups: 6, Mw: 524): 5 parts by weight
Polymerization initiator (Irgacure 184; produced by Ciba Specialty Chemicals Inc.): 0.4 parts by weight
Methyl ethyl ketone: 10 parts by weight Production Example 4

Preparation of Coating Composition 4

A coating composition 4 having the following composition was prepared.
Urethane acrylate (UV1700B; produced by The Nippon Synthetic Chemical Industry Co., Ltd., number of functional groups: 10, Mw: 2000): 4.9 parts by weight
Urethane acrylate (UX8101D; produced by Nippon Kayaku Co., Ltd., number of functional groups: 2, Mw: 5000 or more): 0.1 parts by weight
Polyester acrylate (M9050; produced by TOAGOSEI CO., LTD., number of functional groups: 3, Mw: 400 to 430): 5 parts by weight
Polymerization initiator (Irgacure 184; produced by Ciba Specialty Chemicals Inc.): 0.4 parts by weight
Methyl ethyl ketone: 10 parts by weight Production Example 5

Preparation of Coating Composition 5

A coating composition 5 having the following composition was prepared.
Urethane acrylate (UX8101D; produced by Nippon Kayaku Co., Ltd., number of functional groups: 2, Mw: 5000 or more): 5 parts by weight
Dipentaerythritol hexaacrylate (DPHA; produced by Nippon Kayaku Co., Ltd., number of functional groups: 6, Mw: 524): 5 parts by weight
Polymerization initiator (Irgacure 184; produced by Ciba Specialty Chemicals Inc.): 0.4 parts by weight
Methyl ethyl ketone: 10 parts by weight Production Example 6

Preparation of Coating Composition 6

A coating composition 6 having the following composition was prepared.
Urethane acrylate (UX5003D; produced by Nippon Kayaku Co., Ltd., number of functional groups: 2, Mw: 5000 or more): 3 parts by weight
Dipentaerythritol hexaacrylate (DPHA; produced by Nippon Kayaku Co., Ltd., number of functional groups: 6, Mw: 524): 6 parts by weight N,N-dimethyl monoethanol aminomethacrylate (hydrochloride, number of functional group: 1, Mw: 194): 1 part by weight
Polymerization initiator (Irgacure 184; produced by Ciba Specialty Chemicals Inc.): 0.4 parts by weight
Methyl ethyl ketone: 8 parts by weight
N butanol: 2 parts by weight Production Example 7

Preparation of Coating Composition 7

A coating composition 7 having the following composition was prepared.
Urethane acrylate (UV1700B; produced by The Nippon Synthetic Chemical Industry Co., Ltd., number of functional groups: 10, Mw: 2000): 5 parts by weight
Polyester acrylate (M8030; produced by TOAGOSEI CO., LTD., number of functional groups: 3, Mw: 400 to 430): 5 parts by weight
Polymerization initiator (Irgacure 184; produced by Ciba Specialty Chemicals Inc.): 0.4 parts by weight
Methyl ethyl ketone: 10 parts by weight Production Example 8

Preparation of Coating Composition 8

A coating composition 8 having the following composition was prepared.
Urethane acrylate (UX8101D; produced by Nippon Kayaku Co., Ltd., number of functional groups: 2, Mw: 5000 or more): 10 parts by weight
Polymerization initiator (Irgacure 184; produced by Ciba Specialty Chemicals Inc.): 0.4 parts by weight
Methyl ethyl ketone: 10 parts by weight Production Example 9

Preparation of Coating Composition 9

A coating composition 9 having the following composition was prepared.
Urethane acrylate (UV1700B; produced by The Nippon Synthetic Chemical Industry Co., Ltd., number of functional groups: 10, Mw: 2000): 4 parts by weight
Urethane acrylate (UX8101D; produced by Nippon Kayaku Co., Ltd., number of functional groups: 2, Mw: 5000 or more): 1 part by weight
Polyester acrylate (M9050; produced by TOAGOSEI CO., LTD., number of functional groups: 3, Mw: 400 to 430): 5 parts by weight
Polymerization initiator (Irgacure 184; produced by Ciba Specialty Chemicals Inc.): 0.4 parts by weight
Toluene: 10 parts by weight Production Example 10

Preparation of Coating Composition 10

A coating composition 10 having the following composition was prepared.
Urethane acrylate (UN902; produced by Negami Chemical Industrial Co., Ltd., number of functional groups: 9, Mw: 5900): 5 parts by weight
Polyester acrylate (M9050; produced by TOAGOSEI CO., LTD., number of functional groups: 3, Mw: 400 to 430): 5 parts by weight
Polymerization initiator (Irgacure 184; produced by Ciba Specialty Chemicals Inc.): 0.4 parts by weight
Methyl ethyl ketone: 10 parts by weight Preparation of Composition for Forming Low Refractive Index Layer A composition for forming a low refractive index layer having the following composition was prepared. Surface-treated silica fine particles "having a hollow" (solid content of the silica fine particles: 20% by weight, solution; methyl isobutyl ketone, particle size: 50 nm): 14.3 parts by weight
Pentaerythritol triacrylate (PETA): 1.95 parts by weight
Polymerization initiator (Irgacure 127; produced by Ciba Specialty Chemicals Inc.): 0.1 parts by weight
Modified silicone oil (X22164E; produced by Shin-Etsu Chemical Co., Ltd.): 0.15 parts by weight
Methyl isobutyl ketone: 83.5 parts by weight Example 1

Formation of Optical Layered Body

A triacetyl cellulose (TAC) film (TF80UL; produced by FUJIFILM Corp., thickness: 80 µm) was prepared and 20 g/m$^2$ in a wet weight (10 g/m$^2$ in a dry weight) of the coating composition 1 produced in Production Example 1 was applied to the surface of the film by bar coating, and then dried at 50° C. to remove the solvent. Then, ultraviolet-light irradiation was carried out at an exposure dose of 50 mJ/cm$^2$ with an ultraviolet-light irradiation apparatus (produced by Fusion UV Systems Japan K.K.) to cure the composition, so that a hard coat layer was formed. Next, 0.1 g/m$^2$ in a dry weight of the composition for forming a low refractive index layer was applied to the surface of the hard coat layer by bar coating, and then dried at 40° C. to remove the solvent. Thereafter, ultraviolet-light irradiation was carried out at an exposure dose of 200 mJ/cm$^2$ with the ultraviolet-light irradiation apparatus (produced by Fusion UV Systems Japan K.K.) to produce an optical layered body of Example 1. The film thickness was formed so that the minimum value of its refractive index becomes at a wavelength of around 550 nm (coat thickness: 0.10 µm).

Examples 2 to 6

An optical layered body was produced in each of Examples 2 to 6 by the same method as that in Example 1, except for using each of the coating compositions 2 to 6 in place of the coating composition 1.

Comparative Examples 1 to 4

An optical layered body was produced in each of Comparative Examples 1 to 4 by the same method as that in Example 1, except for using each of the coating compositions 7 to 10 in place of the coating composition 1.
A pencil hardness test was carried out on each of the optical layered bodies obtained above in conformity to JIS K 5600-5-4, so that damage (discoloration) in the low refractive index layer, damage in the hard coat layer, and an interference fringe after the test were evaluated by the following methods. Results are shown in Table 1.

Damage (Discoloration) in Low Refractive Index Layer
Hardness in the pencil scratch test was evaluated as follows: humidity conditioning was carried out on the produced optical layered body at 25° C. and at a relative humidity of 60% for two hours; and the pencil hardness test was carried out under a load of 4.9 N with a test pencil (hardness: 3H) defined in JIS S 6006, in conformity to a method for evaluating pencil hardness defined in JIS K 5600. A black tape for preventing back reflection was attached to the face opposite to the hard coat layer of the optical layered body, and the optical layered body was visually observed from the hard-coat-layer face, so that presence of damage of the low refractive index layer in the optical layered body was visually evaluated under the following criteria.
Good: no discoloration observed
Poor: discoloration observed Damage in Hard Coat Layer Hardness in the pencil scratch test was evaluated as follows: humidity conditioning was carried out on the produced optical layered body at 25° C. and at a relative humidity of 60% for two hours; and the pencil hardness test was carried out under a load of 4.9 N with a test pencil (hardness: 3H) defined in JIS S 6006, in conformity to a method for evaluating pencil hardness defined in JIS K 5600. A black tape for preventing back reflection was attached to the face opposite to the hard coat layer of the optical layered body, and the optical layered body was visually observed from the hard-coat-layer face, so that presence of damage of the hard coat layer in the optical layered body was visually evaluated under the following criteria.
Good: no damage observed
Poor: damage observed Presence of Interference Fringe A black tape for preventing back reflection was attached to the face opposite to the hard coat layer of the optical layered body, and the optical layered body was visually observed from the hard-coat-layer face, so that presence of an interference fringe was visually evaluated under the following criteria.
Good: no interference fringe observed
Poor: interference fringe observed

TABLE 1

| | Damage in low refractive index layer (discoloration) | Damage in hard coat layer | Interference fringe |
|---|---|---|---|
| Example 1 | Good | Good | Good |
| Example 2 | Good | Good | Good |
| Example 3 | Good | Good | Good |
| Example 4 | Good | Good | Good |
| Example 5 | Good | Good | Good |
| Example 6 | Good | Good | Good |
| Comparative Example 1 | Poor | Good | Good |
| Comparative Example 2 | Good | Poor | Poor |
| Comparative Example 3 | Poor | Poor | Poor |
| Comparative Example 4 | Poor | Good | Good |

It was proven from Table 1 that in all the optical layered bodies of the comparative examples, there occurred at least one of damage in the low refractive index layer, damage in the hard coat layer, and an interference fringe after the pencil test; on the other hand, in all the optical layered bodies of the examples, there occurred no damage and discoloration, and no interference fringe, so that an optical property and an appearance were favorably maintained after the pencil test.

INDUSTRIAL APPLICABILITY

The optical layered body obtained by the method for producing an optical layered body of the present invention can suitably apply to a cathode-ray tube (CRT) display device, a liquid crystal display (LCD), a plasma display (PDP), an electroluminescence display (ELD), a field emission display (FED), and the like.

The invention claimed is:

1. A method for producing an optical layered body, comprising applying a coating composition on a light-transmitting substrate,
   wherein the coating composition comprises an urethane (meth)acrylate having a weight-average molecular weight of 6000 to 50,000 and having four or less functional groups, a (meth)acrylate having a weight-average molecular weight of 1000 or less, and a solvent that solubilizes or swells the light-transmitting substrate, forming an infiltration layer, in which a material forming the light-transmitting substrate and the (meth)acrylate are blended together, forming a coat on the infiltration layer, and forming a hard-coating layer and a cushioning layer by curing the infiltration layer and the coat, wherein said cushioning layer and said hard-coating layer is formed with a gradual change in the material characteristics of said cushioning layer and said hard-coating layer, and a hard coat layer which is composed of said hard-coating layer and said cushioning layer is also formed with a gradual change in the material characteristics of said cushioning layer and said hard-coating layer with the light-transmitting substrate.

2. The method for producing an optical layered body according to claim 1,
   wherein the (meth)acrylate has three or more functional groups.

3. The method for producing an optical layered body according to claim 2, wherein a solid content weight ratio of the urethane (meth)acrylate to the (meth)acrylate (urethane (meth)acrylate/(meth)acrylate) in the coating composition is 0.1/99.9 to 5/5.

4. The method for producing an optical layered body according to claim 2 wherein the light-transmitting substrate comprises triacetyl cellulose.

5. The method for producing an optical layered body according to claim 2 further comprising forming a low refractive index layer having a refractive index of less than 1.5.

6. The method for producing an optical layered body according to claim 5, wherein the low refractive index layer contains a hollow silica.

7. The method for producing an optical layered body according to claim 1,
   wherein a solid content weight ratio of the urethane (meth)acrylate to the (meth)acrylate (urethane (meth)acrylate/(meth)acrylate) in the coating composition is 0.1/99.9 to 5/5.

8. The method for producing an optical layered body according to claim 7 wherein the light-transmitting substrate comprises triacetyl cellulose.

9. The method for producing an optical layered body according to claim 7 further comprising forming a low refractive index layer having a refractive index of less than 1.5.

10. The method for producing an optical layered body according to claim 9, wherein the low refractive index layer contains a hollow silica.

11. The method for producing an optical layered body according to claim 1, wherein the light-transmitting substrate comprises triacetyl cellulose.

12. The method for producing an optical layered body according to claim 11 further comprising forming a low refractive index layer having a refractive index of less than 1.5.

13. The method for producing an optical layered body according to claim 12, wherein the low refractive index layer contains a hollow silica.

14. The method for producing an optical layered body according to claim 1, further comprising forming a low refractive index layer having a refractive index of less than 1.5.

15. The method for producing an optical layered body according to claim 14,
wherein the low refractive index layer contains a hollow silica.

16. An optical layered body,
which is obtained by the method for producing an optical layered body according to claim 1.

17. A self-luminous image display device,
comprising the optical layered body according to claim 16 on the outermost surface.

18. A polarizer comprising a polarizing element,
wherein the polarizer includes the optical layered body according to claim 16 on a surface of the polarizing element.

19. A non-self-luminous image display device, comprising the polarizer according to claim 18 on the outermost surface.

20. A non-self-luminous image display device,
comprising the optical layered body according to claim 16 on the outermost surface.

* * * * *